L. H. ROBINSON.
VEHICLE TIRE CLIP.
APPLICATION FILED JUNE 20, 1919.
1,358,019.
Patented Nov. 9, 1920.
Fig. 1.
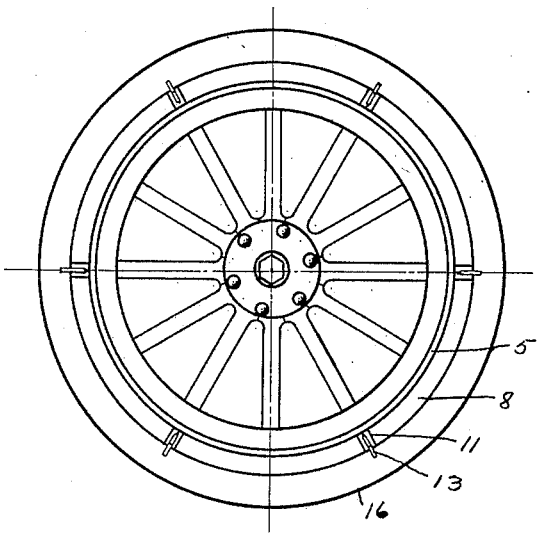
Fig. 2.
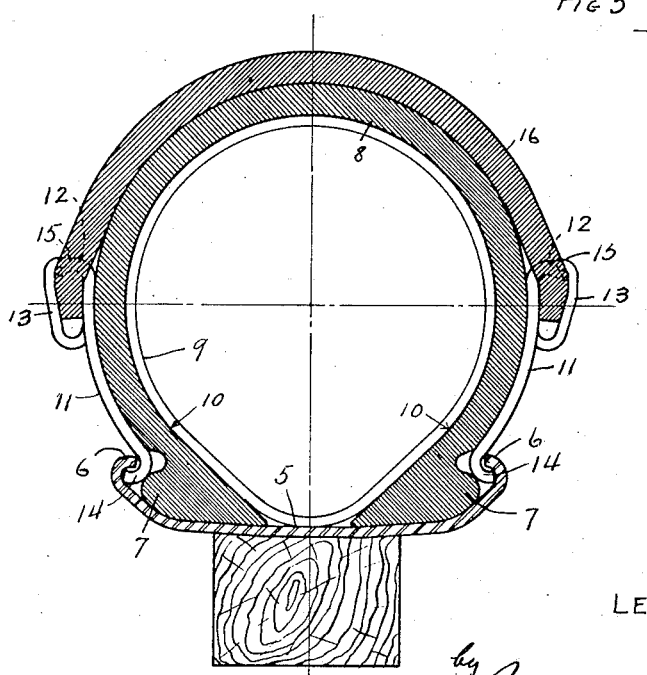
Fig. 3. 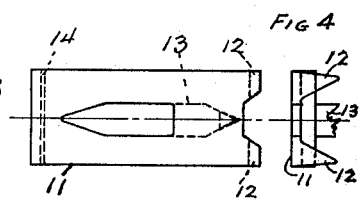 Fig. 4.

INVENTOR
LESTER H. ROBINSON.
by Benjamin, Roodhouse & Lundy
Attys

UNITED STATES PATENT OFFICE.

LESTER H. ROBINSON, OF AURORA, ILLINOIS.

VEHICLE-TIRE CLIP.

1,358,019.

Specification of Letters Patent.

Patented Nov. 9, 1920.

Application filed June 20, 1919. Serial No. 305,508.

*To all whom it may concern:*

Be it known that I, LESTER H. ROBINSON, a citizen of the United States, residing at Aurora, in the county of Kane and State of Illinois, have invented new and useful Improvements in Vehicle-Tire Clips, of which the following is a full, clear, and exact description.

My present invention relates to improvements in vehicle tires, and has special reference to the provision of devices for securing pneumatic tire casings, or in fact any casing, to the rims of vehicle wheels.

A certain not inconsiderable percentage of tire casings are rendered unusable through or by reason of rim cuts and by the breaking of the fabric of the casing, through improper inflation, close to the clencher molding or bead upon the edges of the tire where it assembles with the inwardly turned edge or flanges of the rim. So far as I am aware, no good and dependable manner of repairing such tires has as yet been discovered, although many tires which are rendered unusable by rim cuts and fabric breaks along the clencher edge are otherwise good and would be capable of many miles of satisfactory service if suitable means were provided for securing them to the rim of a wheel.

The principal object of my present invention is the provision of facilities for securing a tire casing to the rim of a vehicle wheel, as will hereafter be seen. The securing means which I have provided may be readily attached to an old casing from which the clencher moldings or beads have been removed; and, when so attached permit of the ready assembling of the casing with and its detachment from the rim of the vehicle wheel. It will also be seen that a casing secured to a rim, as hereinafter described, may be proportioned so that it will hold a considerable part of the pressure developed by the inflation of the tire which not only saves the inner parts from this strain, but materially assists in holding the outside casing properly in place. The devices I supply for securing the casing of the rim also act to bind and protect the edges of the casing and prevent them from being pulled up or torn away from the under casing by rubbing against ruts or other objects. The attaching means, hereinafter described, are so proportioned as to secure the proper positioning of the clip upon the casing and when the clip is so positioned the clips and casing form a structure properly proportioned to surround an ordinary tire and casing, thereby substantially providing a double casing which much extends the life of the whole structure and permits the use of casings which if they were separately required to sustain the pressure of the inflated tire would be too weak to hold.

I have attained the aforementioned objects by means of the structure and arrangement of parts illustrated in the accompanying drawings, in which—

Figure 1 is a side elevation of a vehicle wheel with my invention installed thereon.

Fig. 2 is a transverse section of the tire and rim, drawn to an enlarged scale.

Fig. 3 is a plan of one of the casing securing devices, detached.

Fig. 4 is a fragmental end elevation of the structure shown in Fig. 3.

Figure 5:
Fig. 5 is a side elevation of one of the casing securing devices in final form for attachment.

Similar characters refer to the same parts throughout the divers views. As will be clearly seen from Figs. 1 and 2, the typical wheel and tire structure comprise a rim 5, the edges 6, 6, of which are inwardly turned to engage the clencher moldings or beads 7 of the casing 8. The casing, of course, when in position surrounds and contains an inner inflatable tube 9.

As heretofore indicated, casings are often damaged at the points 10, 10, by means of being cut by the rim or through the breaking of the fabric at these points. Both rim cuts and broken fabric are usually results of improper inflation which permits a great deal of bending of the tire at points 10, 10.

My casing securing device is, preferably, made of a blank 11 of fairly heavy gage metal, upon one edge of which are provided the spurs 12, 12, and from the body of which is stamped out an elongated finger or tongue 13 extending in an opposite direction from the spurs 12. The end of the blank opposite the spurs 12 is bent laterally to form a lip 14 for engaging the inturned edges 6 of the rim. The body of the blank 11 is given a suitable curvature to fit the tire against which it is adapted to be positioned. The spurs 12 are bent laterally in the same direction as the lip 14 and are also slightly curved so that they may be easily set down after being inserted into the inner surface of the casing. The elongated finger or tongue 13 is curved upwardly and backwardly toward the spurs 12, and its end 15 is laterally bent and also somewhat curved so as to be more easily set down into the opposite face of the casing to that engaged by the spurs 12. This finger or tongue 13 forms a gage for adjusting the clip to the casing, as the edge of the casing is set against the finger or tongue 13 before the latter is bent to finally engage the casing. It will also be seen that the finger or tongue 13 surrounds the edge of the casing, thereby forming a binding therefor so as to prevent the casing edge from being frayed or torn away from the inner or surrounding tire casing. The finger 13 also forms a protecting shield to protect the edge of the tire from abrasion from ruts or stones upon the road. The distance between the lip 14 and base of finger or tongue 13 is so proportioned that the inner surface of the outside casing 16 will be of slightly smaller diameter than the outer surface of the inclosed casing 8, thereby causing the outer casing to support a substantial part of the strain of inflation and thereby also securing the outer casing firmly in place upon the inner casing.

A casing equipped with these securing devices or clips as above described is much easier to assemble with a wheel than an ordinary casing as the clips or securing devices upon one side are easily engaged with the flange of the rim before inflation, and the clips or securing devices upon the opposite edge may be then pushed under the opposite rim flange with a screw-driver, or other like instrument when the tire is partially inflated, and upon entire inflation the whole structure is locked in position and cannot be disassembled until the tire is again deflated.

It will now be seen from the foregoing description, taken in connection with the drawings, that I have provided a simple and economically constructed casing securing device which may be easily and quickly mounted on a tire casing from which the clencher beads have been removed and which, when so mounted, will permit of the assembly of a casing so equipped with a wheel and tire so as to supplement the strength of the inclosed tire and protect the same from the wear and tear incident to contact with the road.

Having described my invention, what I claim as new and desire to secure by Letters Patent is:

1. A clip for securing a casing to a vehicle tire comprising a plate, a rim engaging lip at one end of said plate, and members produced from the body of said plate and formed to engage the edge and driven into the opposite faces of said casing, and alternating with each other, whereby one of said members provides a gage into which the edge of the casing is fitted.

2. As an article of manufacture, a plate having a laterally extended flange at one end, lateral spurs at the opposite end of said plate, and a finger produced from the body of said plate and folded back upon the plate to oppose said spurs and to engage the edge of the element interposed between said spurs and said finger, and position said element in the re-entrant angle formed at the bend of said finger.

Signed at Aurora, county of Kane and State of Illinois, this 17th day of June, 1919.

LESTER H. ROBINSON.

Witnesses:
H. J. COOPER,
G. A. SEARGEANT.